United States Patent
Sapra et al.

(10) Patent No.: US 11,652,895 B1
(45) Date of Patent: May 16, 2023

(54) METHODS, SYSTEMS, AND COMPUTER READABLE MEDIA FOR DYNAMIC OPTIMIZED NETWORK FUNCTION DISCOVERY FOR CONSUMER NETWORK FUNCTIONS

(71) Applicant: Oracle International Corporation, Redwood Shores, CA (US)

(72) Inventors: Kawal Sapra, Bangalore (IN); Ann Susan Mathew, Bangalore (IN); Doki Satish Kumar Patro, Bangalore (IN); Venkatesh Aravamudhan, Bangalore (IN)

(73) Assignee: ORACLE INTERNATIONAL CORPORATION, Redwood Shores (CA)

( * ) Notice: Subject to any disclaimer, the term of this patent is extended or adjusted under 35 U.S.C. 154(b) by 0 days.

(21) Appl. No.: 17/672,639

(22) Filed: Feb. 15, 2022

(51) Int. Cl.
*H04L 67/51* (2022.01)
*H04L 41/50* (2022.01)

(52) U.S. Cl.
CPC .......... *H04L 67/51* (2022.05); *H04L 41/5058* (2013.01)

(58) Field of Classification Search
None
See application file for complete search history.

(56) References Cited

U.S. PATENT DOCUMENTS 6,014,558 A    1/2000   Thomas
8,069,101 B1 *  11/2011  von Groll ............ G06Q 30/02
                                                705/36 R (Continued)

FOREIGN PATENT DOCUMENTS

EP    3 716 692 A1     9/2020
WO  WO 2019/076276 A1  4/2019
WO  WO 2019/144321 A1  8/2019

(Continued)

OTHER PUBLICATIONS

"3rd Generation Partnership Project; Technical Specification Group Core Network and Terminals; 5G System; Network Function Repository Services: Stage 3 (Release 17)," 3GPP TS 29.510, V17.4.0, pp. 1-284 (Dec. 2021).

(Continued)

*Primary Examiner* — Lance Leonard Barry (74) *Attorney, Agent, or Firm* — Jenkins, Wilson, Taylor & Hunt, P.A.

(57) ABSTRACT

A method for dynamic optimized NF discovery includes querying an NF repository function (NRF), receiving at least one response to the querying, and building, from the at least one response, an NF discovery data digest of NF profile attributes and corresponding attribute values usable as query parameters in NF discovery requests. The method further includes determining that a consumer NF has a need for a service, and, in response, formulating, using the NF discovery data digest, an NF discovery request message including at least one of the NF profile attribute values as a query parameter. The method further includes transmitting the NF discovery request message to the NRF. The method further includes receiving an NF discovery response from the NRF including at least one NF profile. The method further includes using the at least one NF to facilitate providing of the service to the consumer NF.

20 Claims, 4 Drawing Sheets

(56) References Cited

U.S. PATENT DOCUMENTS

| | | | |
|---|---|---|---|
| 8,069,181 B1* | 11/2011 | Krishnan | G06Q 10/00 707/769 |
| 9,124,537 B2 | 9/2015 | Kolze | |
| 9,246,762 B1 | 1/2016 | Watkins | |
| 10,313,362 B2 | 6/2019 | Ahuja et al. | |
| 10,609,530 B1 | 3/2020 | Patil et al. | |
| 10,637,753 B1 | 4/2020 | Taft et al. | |
| 10,686,667 B1* | 6/2020 | Subramaniam | H04L 41/122 |
| 10,772,062 B1 | 9/2020 | Albasheir et al. | |
| 11,109,307 B2 | 8/2021 | Bartolome Rodrigo et al. | |
| 11,220,027 B2 | 1/2022 | Heath, III et al. | |
| 11,271,846 B2 | 3/2022 | Krishan | |
| 11,483,694 B2 | 10/2022 | Krishan | |
| 11,528,334 B2 | 12/2022 | Krishan | |
| 11,570,262 B2 | 1/2023 | Sapra et al. | |
| 2005/0181776 A1 | 8/2005 | Verma et al. | |
| 2005/0193096 A1 | 9/2005 | Yu et al. | |
| 2006/0010224 A1 | 1/2006 | Sekar et al. | |
| 2007/0050331 A1 | 3/2007 | Bauman et al. | |
| 2008/0101293 A1 | 5/2008 | Woo et al. | |
| 2009/0222584 A1 | 9/2009 | Josefsberg et al. | |
| 2013/0086245 A1* | 4/2013 | Lu | H04L 12/66 709/250 |
| 2013/0198269 A1 | 8/2013 | Fleischman et al. | |
| 2013/0272123 A1 | 10/2013 | Lee et al. | |
| 2014/0040975 A1 | 2/2014 | Raleigh et al. | |
| 2015/0358385 A1 | 12/2015 | Ruellan et al. | |
| 2016/0156513 A1 | 6/2016 | Zhang et al. | |
| 2016/0350683 A1 | 12/2016 | Bester et al. | |
| 2016/0380906 A1 | 12/2016 | Hodique et al. | |
| 2017/0077751 A1 | 3/2017 | Forbes | |
| 2017/0221015 A1 | 8/2017 | June et al. | |
| 2018/0205637 A1 | 7/2018 | Li | |
| 2018/0262625 A1 | 9/2018 | McCarley et al. | |
| 2018/0285794 A1 | 10/2018 | Gray-Donald et al. | |
| 2018/0324247 A1 | 11/2018 | Hood et al. | |
| 2019/0007366 A1 | 1/2019 | Voegele et al. | |
| 2019/0116217 A1 | 4/2019 | Dhanabalan | |
| 2019/0140895 A1 | 5/2019 | Ennis, Jr. et al. | |
| 2019/0222633 A1 | 7/2019 | Howes et al. | |
| 2019/0230556 A1 | 7/2019 | Lee | |
| 2019/0245767 A1 | 8/2019 | Di Girolamo et al. | |
| 2019/0342229 A1 | 11/2019 | Khinvasara et al. | |
| 2019/0394284 A1 | 12/2019 | Baghel et al. | |
| 2020/0036754 A1 | 1/2020 | Livanos | |
| 2020/0059420 A1 | 2/2020 | Abraham | |
| 2020/0106812 A1 | 4/2020 | Verma et al. | |
| 2020/0127916 A1 | 4/2020 | Krishan | |
| 2020/0136911 A1 | 4/2020 | Assali et al. | |
| 2020/0137174 A1 | 4/2020 | Stammers et al. | |
| 2020/0153886 A1 | 5/2020 | Dhanabalan | |
| 2020/0305033 A1 | 9/2020 | Keller et al. | |
| 2020/0314615 A1 | 10/2020 | Patil et al. | |
| 2020/0336554 A1 | 10/2020 | Deshpande et al. | |
| 2021/0007023 A1 | 1/2021 | Umapathy et al. | |
| 2021/0044481 A1 | 2/2021 | Xu et al. | |
| 2021/0076248 A1 | 3/2021 | Kallam et al. | |
| 2021/0136602 A1 | 5/2021 | Pokkunuri et al. | |
| 2021/0168055 A1 | 6/2021 | Lair | |
| 2021/0204200 A1 | 7/2021 | Krishan et al. | |
| 2021/0235254 A1 | 7/2021 | Farooq | |
| 2021/0273977 A1 | 9/2021 | Karasaridis et al. | |
| 2021/0274392 A1 | 9/2021 | Dao et al. | |
| 2021/0297935 A1 | 9/2021 | Belling et al. | |
| 2021/0367916 A1 | 11/2021 | Belling et al. | |
| 2021/0385286 A1 | 12/2021 | Wang et al. | |
| 2021/0385732 A1 | 12/2021 | Reyes et al. | |
| 2022/0038545 A1 | 2/2022 | Krishan | |
| 2022/0070648 A1 | 3/2022 | Krishan | |
| 2022/0110082 A1* | 4/2022 | Belling | H04L 63/20 |
| 2022/0131945 A1 | 4/2022 | Sapra et al. | |
| 2022/0191294 A1 | 6/2022 | Yang et al. | |
| 2022/0295384 A1 | 9/2022 | Gupta et al. | |
| 2022/0394453 A1 | 12/2022 | Goel | |
| 2022/0394597 A1 | 12/2022 | Goel | |
| 2022/0417783 A1 | 12/2022 | Srivastava et al. | |
| 2023/0052267 A1 | 2/2023 | Goel et al. | |

FOREIGN PATENT DOCUMENTS

| | | | | |
|---|---|---|---|---|
| WO | WO 2019/215308 A1 | 11/2019 | | |
| WO | WO 2020/001842 A1 | 1/2020 | | |
| WO | WO 2020/030291 A1 | 2/2020 | | |
| WO | WO 2020/083516 A1 | 4/2020 | | |
| WO | WO 2020/192254 A1 | 10/2020 | | |
| WO | WO-2021011933 A1 * | 1/2021 | | H04L 61/1541 |
| WO | WO-2021092441 A1 * | 5/2021 | | |
| WO | WO 2021/110287 A1 | 6/2021 | | |
| WO | WO 2022/025987 A1 | 2/2022 | | |
| WO | WO 2022/050987 A1 | 3/2022 | | |
| WO | WO 2022/093319 A1 | 5/2022 | | |
| WO | WO 2022/197531 A1 | 9/2022 | | |
| WO | WO 2022/256306 A1 | 12/2022 | | |

OTHER PUBLICATIONS

Notice of Allowance and Fee(s) Due for U.S. Appl. No. 17/082,871 (dated Sep. 28, 2022).

Notification of Transmittal of the International Search Report and the Written Opinion of the International Searching Authority, or the Declaration for International Application No. PCT/US2022/031566 (dated Sep. 2, 2022).

Notice of Allowance and Fee(s) Due for U.S. Appl. No. 16/945,794 (dated Aug. 2, 2022).

Notice of Allowance for U.S. Appl. No. 17/200,777 (dated Jun. 30, 2022).

Final Office Action for U.S. Appl. No. 17/082,871 (dated Jun. 6, 2022).

Notice of Allowance for U.S. Appl. No. 17/009,725 (dated Jun. 13, 2022).

"3rd Generation Partnership Project; Technical Specification Group Core Network and Terminals; 5G System; Network Function Repository Services, Stage 3 (Release 16)," 3GPP TS 29.510, V16.6.0, pp. 1-227 (Jan. 2021).

Notification of Transmittal of the International Search Report and the Written Opinion of the International Searching Authority, or the Declaration for International Application No. PCT/US2022/019848 (dated Jun. 14, 2022).

Advisory Action and Examiner-Initiated Interview Summary for U.S. Appl. No. 16/945,794 (dated May 20, 2022).

Notice of Allowance for U.S. Appl. No. 17/203,693 (dated Mar. 17, 2022).

Final Office Action for U.S. Appl. No. 16/945,794 (dated Feb. 8, 2022).

Non-Final Office Action for U.S. Appl. No. 17/082,871 (dated Feb. 7, 2022).

Commonly-assigned, co-pending U.S. Appl. No. 17/543,989 for "Methods, Systems, and Computer Readable Media for Dynamic Adjustment to Network Function Profile for Discovery Responses" (Unpublished, filed Dec. 17, 2021).

Commonly-assigned, co-pending U.S. Appl. No. 17/397,968 for "Methods, Systems, and Computer Readable Media for Processing Network Function (NF) Discovery Requests at NF Repository Function (NRF) Using Prioritized Lists of Preferred Locations" (Unpublished, filed Aug. 9, 2021).

Commonly-assigned, co-pending U.S. Appl. No. 17/356,461 for "Methods, Systems and Computer Readable Media for Optimizing Network Traffic Distribution using Timeslot-Based Tracked Producer Network Function (NF) Performance During Producer NF Selection" (Unpublished, filed Jun. 23, 2021).

Commonly-assigned, Co-pending U.S. Appl. No. 17/337,356 for "Methods, Systems, and Computer Readable Media for Applying or Overriding Preferred Locality Criteria in Processing Network Function (NF) Discovery Requests," (Unpublished, filed Jun. 6, 2021).

Commonly-assigned, co-pending U.S. Appl. No. 17/485,284 for "Methods, Systems and Computer Readable Media for Providing (56) References Cited

OTHER PUBLICATIONS

Priority Resolver for Resolving Priorities and Network Function (NF) Instances" (Unpublished, filed Sep. 24, 2021).
Notice of Allowance and Fee(s) Due for U.S. Appl. No. 16/356,446 (dated Sep. 30, 2021).
Notification of Transmittal of the International Search Report and the Written Opinion of the International Searching Authority, or the Declaration for International Application No. PCT/US2021/033031 (dated May 18, 2021).
Non-Final Office Action for U.S. Appl. No. 16/945,794 (dated Sep. 15, 2021).
Commonly-assigned, co-pending U.S. Appl. No. 17/468,076 for "Methods, Systems, and Computer Readable Media for Using Service Communications Proxy (SCP) or Security Edge Protection Proxy (SEPP) to Apply or Override Preferred-Locality Attribute During Network Function (NF) Discovery" (Unpublished, filed Sep. 7, 2021).
Commonly-assigned, co-pending U.S. Appl. No. 17/487,142 for "Methods, Systems, and Computer Readable Media for Network Function Discovery Using Preferred-Locality Information" (Unpublished, filed Sep. 28, 2021).
"3rd Generation Partnership Project; Technical Specification Group Services and System Aspects; Security architecture and procedures for 5G system (Release 17)," 3GPP TS 33.501, V17.3.0, pp. 1-258 (Sep. 2021).
"3rd Generation Partnership Project; Technical Specification Group Core Network and Terminals; 5G System; Network Function Repository Services; Stage 3 (Release 17)," 3GPP TS 29.510, V17.3.0, pp. 1-271 (Sep. 2021).
"3rd Generation Partnership Project; Technical Specification Group Services and System Aspects; System architecture for the 5G System (5GS); Stage 2 (Release 17)," 3GPP TS 23.501, V17.2.0, pp. 1-542 (Sep. 2021).
"3rd Generation Partnership Project; Technical Specification Group Core Network and Terminals; 5G System; Technical Realization of Service Based Architecture; Stage 3 (Release 17)," 3GPP TS 29.500, V17.4.0, pp. 1-109 (Sep. 2021).
Notification of Transmittal of the International Search Report and the Written Opinion of the International Searching Authority, or the Declaration for International Application No. PCT/US2021/024000 (dated Jun. 24, 2021).
Non-Final Office Action for U.S. Appl. No. 16/356,446 (dated Jun. 16, 2021).
Commonly-assigned, co-pending U.S. Appl. No. 17/337,356 for "Methods, Systems, and Computer Readable Media for Applying or Overriding Preferred Locality Criteria in Processing Network Function (NF) Discovery Requests," (Unpublished, filed Jun. 2, 2021).
Notification of Transmittal of the International Search Report and the Written Opinion of the International Searching Authority, or the Declaration for U.S. Patent Application Serial No. PCT/US2021/020120 (dated Jun. 1, 2021).
"TCP congestion control," Wikipedia, pp. 1-15 (Mar. 4, 2021).
"3rd Generation Partnership Project; Technical Specification Group Core Network and Terminals; Numbering, addressing and identification; (Release 17)," 3GPP TS 23.003, V17.1.0, pp. 1-143 (Mar. 2021).
"3rd Generation Partnership Project; Technical Specification Group Core Network and Terminals; 5G System; Network Function Repository Services; Stage 3 (Release 17)," 3GPP TS 29.510, V17.1.0, pp. 1-243 (Mar. 2021).
"3rd Generation Partnership Project; Technical Specification Group Core Network and Terminals; 5G System; Session Management Services; Stage 3 (Release 17)," 3GPP 29.502, V17.1.0, pp. 1-299 (Jun. 2021).
"3rd Generation Partnership Project; Technical Specification Group Core Network and Terminals; 5G System; Principles and Guidelines for Services Definition; Stage 3 (Release 17)," 3GPP TS 29.501, V17.2.0, pp. 1-78 (Jun. 2021).
"3rd Generation Partnership Project; Technical Specification Group Core Network and Terminals; 5G System; Technical Realization of Service Based Architecture; Stage 3 (Release 17)," 3GPP TS 29.500, V17.2.0, pp. 1-100 (Mar. 2021).
"3rd Generation Partnership Project; Technical Specification Group Services and System Aspects; Security architecture and procedures for 5G system (Release 17)," 3GPP TS 33.501, V17.1.0, pp. 1-256 (Mar. 2021).
"3rd Generation Partnership Project; Technical Specification Group Core Network and Terminals; 5G System; Public Land Mobile Network (PLMN) Interconnection; Stage 3 (Release 17)," 3GPP TS 29.573, V17.0.0, pp. 1-100 (Mar. 2021).
"3rd Generation Partnership Project; Technical Specification Group Services and System Aspects; System architecture for the 5G System (5GS); Stage 2 (Release 17)," 3GPP TS 23.501, V17.0.0, pp. 1-489 (Mar. 2021).
Commonly-assigned, co-pending U.S. Appl. No. 17/203,693 for "Methods, Systems, and Computer Readable Media for Hypertext Transfer Protocol (HTTP) Stream Tuning for Load and Overload Control," (Unpublished, filed Mar. 16, 2021).
Commonly-assigned, co-pending U.S. Appl. No. 17/200,777 for "Methods, Systems, and Computer Readable Media for Supporting Multiple Preferred Localities for Network Function (NF) Discovery and Selection Procedures" (Unpublished, filed Mar. 13, 2021).
"3rd Generation Partnership Project; Technical Specification Group Core Network and Terminals; 5G System; Network Function Repository Services; Stage 3 (Release 17)," 3GPP TS 29.510, V17.0.0, pp. 1-229 (Dec. 2020).
"3rd Generation Partnership Project; Technical Specification Group Core Network and Terminals; 5G System; Technical Realization of Service Based Architecture; Stage 3 (Release 17)," 3GPP TS 29.500, V17.1.0, pp. 1-90 (Dec. 2020).
Advisory Action for U.S. Appl. No. 16/356,446 (dated Dec. 22, 2020).
Commonly-assigned, co-pending U.S. Appl. No. 17/082,871 for "Methods, Systems, and Computer Readable Media for Rank Processing for Network Function Selection," (Unpublished, filed Oct. 28, 2020).
Final Office Action for U.S. Appl. No. 16/356,446 (dated Sep. 8, 2020).
Commonly-assigned, co-pending U.S. Appl. No. 17/009,725 for "Methods, Systems, and Computer Readable Media for Service Communications Proxy (SCP)-Specific Prioritized Network Function (NF) Discovery and Routing," (Unpublished, filed Sep. 1, 2020).
Commonly-assigned, co-pending U.S. Appl. No. 16/945,794 for "Methods, Systems, and Computer Readable Media for Preferred Network Function (NF) Location Routing Using Service Communications Proxy (SCP)," (Unpublished, filed Jul. 31, 2020).
"3rd Generation Partnership Project; Technical Specification Group Core Network and Terminals; 5G System; Network Function Repository Services; Stage 3 (Release 16)," 3GPP TS 29.510 V16.4.0, pp. 1-206 (Jul. 2020).
"3rd Generation Partnership Project; Technical Specification Group Services and System Aspects; Procedures for the 5G System (5GS); Stage 2 (Release 17)," 3GPP TS 23.502, V17.0.0, pp. 1-646 (Mar. 2021).
"3rd Generation Partnership Project; Technical Specification Group Services and System Aspects; Procedures for the 5G System (5GS); Stage 2 (Release 16)," 3GPP TS 23.502 V16.4.0, pp. 1-582 (Mar. 2020).
"3rd Generation Partnership Project; Technical Specification Group Services and System Aspects; System architecture for the 5G System (5GS); Stage 2 (Release 16)," 3GPP TS 23.501 V16.4.0, pp. 1-430 (Mar. 2020).
Non-Final Office Action for U.S. Appl. No. 16/356,446 (dated May 11, 2020).
Nokia et al., "Discussion paper on authorization for Model D Indirect communications", 3GPP TSG SA WG3; S3-194380 (Nov. 11, 2019).
Commonly-assigned, co-pending U.S. Appl. No. 16/356,446 for "Methods, Systems, and Computer Readable Media for Locality-Based Selection and Routing of Traffic to Producer Network Functions (NFs)," (Unpublished, filed Mar. 18, 2019).

(56) References Cited

OTHER PUBLICATIONS

Belshe et al., "Hypertext Transfer Protocol Version 2 (HTTP/2)," Internet Engineering Task Force (IETF), RFC 7540, pp. 1-96 (May 2015).

Fielding et al. "Hypertext Transfer Protocol (HTTP/1.1): Semantics and Content", Internet Engineering Taskforce (IETF) Request for Comments: 7231, IEFT RFC 7231, pp. 1-102 (Jun. 2014).

Vixie et al., "Dynamic Updates in the Domain Name System (DNS Update)," Network Working Group, RFC 2136, pp. 1-26 (Apr. 1997).

Non-Final Office Action for U.S. Appl. No. 17/337,356 (dated Jan. 17, 2023).

Notice of Publication for U.S. Appl. No. 17/356,461 (dated Dec. 29, 2022).

Notice of Publication for International Application Serial No. PCT/US2022/031566 (dated Dec. 8, 2022).

Non-Final Office Action for U.S. Appl. No. 17/397,968 (dated Dec. 9, 2022).

\* cited by examiner

METHODS, SYSTEMS, AND COMPUTER READABLE MEDIA FOR DYNAMIC OPTIMIZED NETWORK FUNCTION DISCOVERY FOR CONSUMER NETWORK FUNCTIONS

TECHNICAL FIELD

The subject matter described herein relates to service discovery in communications networks. More particularly, the subject matter described herein relates to methods, systems, and computer readable media for dynamic optimized network function (NF) discovery for consumer NFs.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides a service. A given producer NF may include more than one NF instance. It should also be noted that multiple NF instances can share the same service endpoint.

NFs register with a network function repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the type of service provided by an NF instance as well as contact and capacity information regarding the NF instance. Thus, it is desirable for consumer NFs to be able to formulate NF discovery requests with query parameters that are optimized for locating producer NFs that are capable of and best suited for providing a service requested by the consumer NFs.

A service communication proxy (SCP) can also invoke the NF discovery service operation to learn about available producer NF instances. The case where the SCP uses the NF service discovery procedure to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instances. The communications model where consumer NFs communicate with producer NFs via the SCP is referred to as the indirect communications model.

In addition to the SCP, another example of an intermediate proxy that forwards traffic between producer and consumer NFs is the security edge protection proxy (SEPP). The SEPP is the network function used to protect control plane traffic that is exchanged between different 5G public land mobile networks (PLMNs). As such, the SEPP performs message filtering, policing and topology hiding for all application programming interface (API) messages that are transmitted between PLMNs.

One problem that can occur in 5G and other communications networks is that consumer NFs may lack the intelligence to format queries for NF discovery service operations that result in optimized sets of NF profiles of producer NFs to provide service to the consumer NFs. For example, a consumer NF may formulate a query to the NRF to discover NF profiles of producer NFs that provide a given service. However, the consumer NF may not know which PLMN or network slice provides the given service for a particular subscription permanent identifier (SUR). Accordingly, the NRF may respond with either an empty set of NF profiles, because none of the NF profiles match the query parameters in the NF discovery request or a sub-optimal set of NF profiles containing NF profiles of producer NFs that can provide the service but may not be optimal for the particular consumer NF. In the empty set case, the consumer NF may be required to repeat the NF service discovery procedure multiple times with different sets of query parameters, which increases latency in providing the service. In the case where the consumer NF receives a suboptimal set of NF profiles, the consumer NF may select a producer NF to provide the service that is inefficient, due to factors such as load and/or location. Accordingly, in light of these difficulties, there exists a need for improved methods, systems, and computer readable media for dynamic optimized NF discovery.

SUMMARY

A method for dynamic optimized network function (NF) discovery includes querying an NF repository function (NRF), receiving at least one response to the querying, and building, from the at least one response, an NF discovery data digest of NF profile attributes and corresponding attribute values usable as query parameters in NF discovery requests. The method further includes determining that a consumer NF has a need for a service, and, in response, formulating, using the NF discovery data digest, an NF discovery request message including at least one of the NF profile attribute values as a query parameter. The method further includes transmitting the NF discovery request message to the NRF. The method further includes receiving an NF discovery response from the NRF including at least one NF profile. The method further includes using the at least one NF profile to facilitate providing of the service to the consumer NF.

According to another aspect of the subject matter described herein, querying the NRF includes periodically or aperiodically transmitting requests for NF discovery service operations to the NRF.

According to another aspect of the subject matter described herein, periodically or aperiodically transmitting the requests for NF discovery service operations to the NRF includes transmitting the requests independently of a current need of the consumer NF for a service provided by producer NF instances.

According to another aspect of the subject matter described herein, building the NF discovery data digest includes reading, from the responses, a subset of NF profile attributes and attribute values usable as query parameters in the NF discovery requests.

According to another aspect of the subject matter described herein, building the NF discovery data digest includes creating, in the NF discovery data digest, mappings between the NF profile attributes read from the responses.

According to another aspect of the subject matter described herein, creating the mappings between the NF profile attributes includes classifying the attributes into sets of NF profile attributes that are mapped to one or more common attributes, wherein the common attributes include at least one of: public land mobile network (PLMN), network slice instance (nsi)-list, service name, single network slice selection assistance information (S-NSSAI), and locality.

According to another aspect of the subject matter described herein, the attributes that are mapped to the one or more common attributes include attributes associated with individual NF types.

According to another aspect of the subject matter described herein, formulating the NF discovery request message using the NF discovery data digest includes accessing the NF discovery data digest using a first NF profile attribute value, using one of the mappings to determine a second NF profile attribute value mapped to the first NF profile attribute value, and including the second NF profile attribute value in the NF discovery request.

According to another aspect of the subject matter described herein, the first NF profile attribute value includes an attribute value associated with a subscriber and the second NF profile attribute value includes an attribute value associated with a producer NF.

According to another aspect of the subject matter described herein, using the at least one NF profile to facilitate providing of the service to the consumer NF includes forwarding the at least one NF profile to the consumer NF or an SCP that performs delegated discovery on behalf of the consumer NF.

According to another aspect of the subject matter described herein, a system for dynamic optimized network function (NF) discovery is provided. The system includes a computing platform or environment including at least one processor. The system includes an NF discovery data digest module implemented using the at least one processor for querying an NF repository function (NRF), receiving at least one response to the querying, and building, from the at least one response, an NF discovery data digest of NF profile attributes and corresponding attribute values usable as query parameters in NF discovery requests. The system further includes an NRF interaction module for determining that a consumer NF has a need for a service, and, in response, formulating, using the NF discovery data digest, an NF discovery request message including at least one of the NF profile attribute values as a query parameter, transmitting the NF discovery request message to the NRF, receiving an NF discovery response from the NRF including at least one NF profile, and using the at least one NF profile to further providing of the service to the consumer NF.

According to another aspect of the subject matter described herein, the NF discovery data digest module is configured to query the NRF by periodically or aperiodically transmitting requests for NF discovery service operations to the NRF.

According to another aspect of the subject matter described herein, the NF discovery data digest module is configured to periodically or aperiodically transmit the requests for NF discovery service operations to the NRF independently of a current need of the consumer NF for a service provided by producer NF instances.

According to another aspect of the subject matter described herein, the NF discovery data digest module is configured to build the NF discovery data digest by reading, from the responses, a subset of NF profile attributes and attribute values usable as query parameters in the NF discovery requests and store the subset of NF profile attributes and attribute values in the NF discovery data digest.

According to another aspect of the subject matter described herein, the NF discovery data digest module is configured to build the NF discovery data digest by creating mappings between the NF profile attributes read from the responses.

According to another aspect of the subject matter described herein, the NF discovery data digest module is configured to create the mappings between the NF profile attributes by classifying the NF profile attributes into sets that share one or more common NF profile attributes, wherein the one or more common NF profile attributes include at least one of: public land mobile network (PLMN), network slice instance (nsi)-list, single network slice selection assistance information (S-NSSAI), service name, and locality.

According to another aspect of the subject matter described herein, the attributes that are mapped to the one or more common attributes include attributes associated with individual NF types.

According to another aspect of the subject matter described herein, the NRF interaction module is configured to formulate the NF discovery request message using the NF discovery data digest by accessing the NF discovery data digest using a first NF profile attribute value, using one of the mappings to determine a second NF profile attribute value mapped to the first NF profile attribute value, and including the second NF profile attribute value in the NF discovery request.

According to another aspect of the subject matter described herein, the NRF interaction module is configured to facilitate the providing of the service to the consumer NF by forwarding the at least one NF profile to the consumer NF or an SCP that performs delegated discovery on behalf of the consumer NF.

According to another aspect of the subject matter described herein, one or more non-transitory computer readable media having stored thereon executable instructions that when executed by one or more processors of one or more computers control the one or more computers to perform steps is provided. The steps include querying a network function (NF) repository function (NRF), receiving at least one response to the querying, and building, from the at least one response, an NF discovery data digest of NF profile attributes and corresponding attribute values usable as query parameters in NF discovery requests. The steps further include determining that a consumer NF has a need for a service, and, in response, formulating, using the NF discovery data digest, an NF discovery request message including at least one of the NF profile attribute values as a query parameter. The steps further include transmitting the NF discovery request message to the NRF. The steps further include receiving an NF discovery response from the NRF including at least one NF profile. The steps further include using the at least one NF profile to facilitate providing of the service to the consumer NF.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
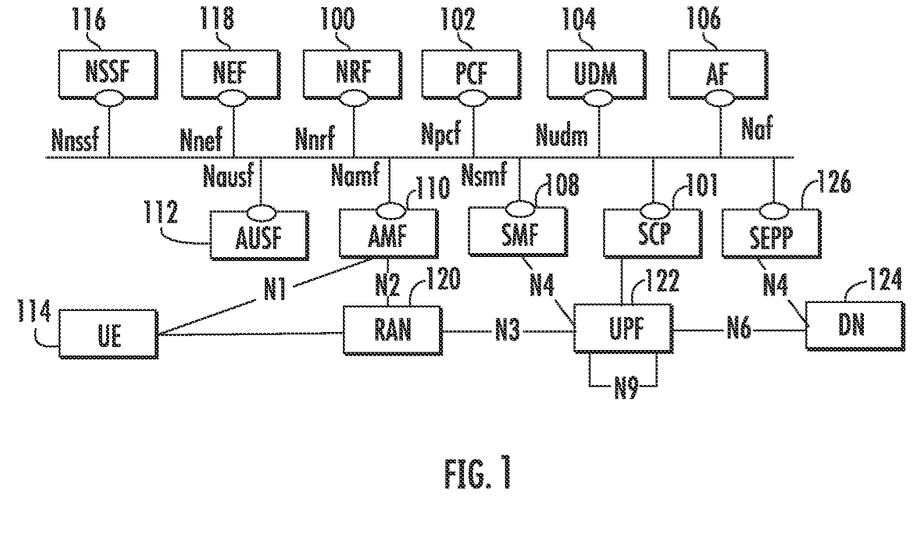
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for service profiles of NF instances and SCP profiles of SCP instances. In order to communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the type of service provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management (UDM) 104 that manages user data, and an application function (AF) 106 that provides application services.

The NFs illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN.

As stated above, one problem that can occur in 5G and other networks is that consumer NFs may lack the intelligence and/or query parameters to formulate optimal NF discovery request messages. For example, before performing an NF discovery query towards an NRF, a consumer NF may not be completely aware of the producer NF capabilities, deployment models, locations, PLMNs, and slices. As a result, the consumer NF is incapable of choosing optimal discovery query attribute values and will have to apply various algorithms sequentially before the consumer NF discovers the producer NFs that best match the requirements of the consumer NF. One possible effect of a sub-optimal NF discovery query is that the consumer NF may discover one or more producer NFs that are not optimal in providing the requested service, and the consumer NF may select a producer NF to provide the service that is not local to the consumer NF or of a lower priority than another producer in NF that could provide the service.

If the consumer NF obtains a set of NF profiles from the NRF that does not contain any usable producer NF profiles (either an empty set or a set of NF profiles of producer NFs that cannot provide the requested service, for example, due to loading), the consumer NF may be forced to query the NRF multiple times with different query parameters. Requiring the consumer NF to query the NRF multiple times can cause end user latency and consume network resources in the 5G network.

Cloud-based 5G solutions are becoming more automated and dynamic. Accordingly, it is desirable to provide a consumer NF that is capable of performing dynamic optimized NF discovery.

Figure 2:
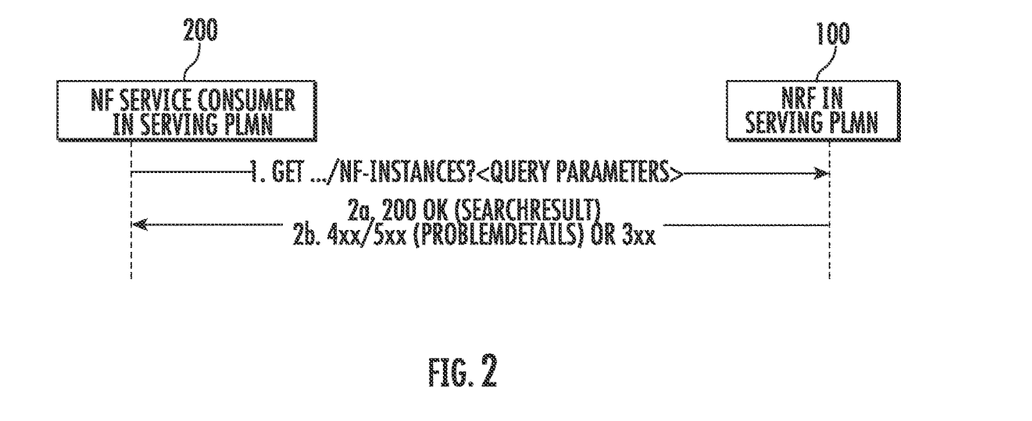
FIG. 2 is a message flow diagram illustrating exemplary messages exchanged between a consumer NF and an NRF in the NF discovery service operation.

FIG. 2 is a message flow diagram illustrating exemplary messages exchanged in the NF discovery service operation. Referring to FIG. 2, in line 1A, consumer NF 200 formulates and sends an NF discovery request message to NRF 100. The NF discovery request message includes a hypertext transfer protocol (HTTP) GET method and query parameters used by the NRF to search its NF profiles database and locate NF profiles that match the query parameters in the NF discovery request. If the NF discovery request service operation is successful, NRF 100 responds as indicated in line 2a with a 200 OK message including a set of NF profiles that match the query parameters in the NF discovery request. If the NF discovery service operation is unsuccessful, NRF 100 responds as indicated as in line 2b with a 4XX or 5XX message specifying problem details. If the NF discovery request message is redirected, NRF 100 responds with a 3XX message indicating redirection.

The subject matter described herein includes an NF that optimizes the NF discovery request operation to include query parameters that are likely to result in an optimal set of NF profiles. In FIG. 2, the NF that formulates the discovery request is a consumer NF located in the same PLMN, which is the PLMN serving an end user. However, the subject matter described herein is not limited to this case. For example, the subject matter described herein can be used to optimize NF discovery requests between a consumer NF located in a different PLMN from the NRF. In a scenario in which the end user is roaming, the consumer NF that formulates an NF discovery request may be located in the PLMN serving the end user, and the NRF may be located in a home PLMN of the end user. In another example, the subject matter described herein may be utilized to optimize NF discovery service operations between NRFs located in different PLMNs. In yet another example, the subject matter described herein may be used to optimize NF discovery service operations from an SCP to an NRF located in the same or a different PLMN.

An NF (e.g., a consumer NF, an NRF, or an SCP), as described herein, can perform dynamic optimized service discovery in an automated way by formulating an efficient query to obtain specific producer NF profiles from the NRF. The subject matter described herein proactively creates (i.e., independently from a need of a consumer NF or a query from the consumer NF for a service provided by producer NFs) an NF discovery data digest including query parameters that can be used in an NF discovery request sent in response to a need of a consumer NF or request from the consumer NF to access a service provided by producer NFs. The NF discovery data digest may include a subset of attributes or parameters and the corresponding attribute or parameter values contained in NF profiles of producer NFs that are registered with the NRF. The NF discovery data digest may include mappings between attributes so that the querying NF can form intelligent NF discovery queries. For example, the digest may include mappings between subscription permanent identifiers (SUPIs), localities, PLMNs, and other attributes that the querying NF can use to formulate a query that will result in discovery of a producer NF profile of a producer NF that serves the PLMN in which a subscriber is currently located. Examples of attributes and mappings between attributes that can be included in the NF discovery data digest will be described in further detail below.

Different operator defined rules can be applied automatically using the digest, which can help consumer NFs to include specific search attributes and attribute values when sending an NF discovery request to obtain specific producer NF profiles. The NRF will return a discovery response including producer NF profiles based on the search query as per 3GPP-defined procedures. As indicated above, the subject matter described herein can be implemented by consumer NFs, SCPs, or NRFs to optimize their NF discovery requests. The solution described herein is backward compatible with 3GPP-defined procedures on consumer NFs, SCPs, and NRFs. There is no change required in any interface defined by 3GPP. The algorithm is optimized based on rules and applied to data. The subject matter described herein helps to formulate NF discovery queries towards the NRF to access service in an optimized way with reduced latency.

As stated above, the subject matter described herein includes creating an NF discovery data digest containing NF profile attributes, their attribute values, and mappings between attribute values that are used in formulating and if discovery requests. The NF discovery data digest may be formulated by a discovery data digest module, which will be described in detail below. Table 1 shown below is an example of attributes and mappings between attributes that may be present in an NF discovery data digest.

TABLE 1

Example NF Discovery Data Digest Attributes

Common NF Attributes
PLMN
nsi-list
snssai
service name
locality

| Mobility Management | | Session Management | | Subscriber Database | |
| --- | --- | --- | --- | --- | --- |
| Attribute | NF Type | Attribute | NF Type | Attribute | NF Type |
| amf-set-id | AMF | tai | SMF, AMF, UPF | supi | UDM, unified data repository (UDR), AUSF, PCF, Unstructured data storage function (UDSF) |
| amf-region-id | AMF | dnn | PCF, BSF, UPF | General public subscription identifier (gpsi) | UDM, UDR, AUSF, PCF, NEF |
| guami | AMF | ue-ipv4-address | BSF | routing-indicators | UDM, AUSF |
| smf-serving-area | UPF | ue-ipv6-prefix | BSF | external-group-identity | UDM, UDR |
| | | ip domain | BSF | | |

As indicated in Table 1, the example NF discovery data digest includes NF profile attributes and mappings between the attributes. It is also understood that the NF discovery data digest would include values for the attributes. The values for the NF profile attributes in the NF discovery data digest are usable as query parameters in targeted NF discovery requests. An NF discovery data digest such as that illustrated in Table 1 may be replicated for each set of common NF profile attribute values. For example, in Table 1, the common attribute values are PLMN, network slice instance (NSI) list, single network slice selection assistance information (SNSSAI), service name, and locality. Taking the PLMN attribute as an example, an NF discovery data digest, such as that illustrated in Table 1, may be constructed for each PLMN so that a consumer NF that knows the PLMN that the consumer NF wants to access can query the digest using the PLMN ID and other attributes to obtain NF type specific attributes to formulate an optimized NF discovery query to the NRF.

In Table 1, the NF specific attributes that are mapped to the set of common attributes are divided into categories of mobility management, session management, and subscriber database. Under the mobility management category, NF profile attributes of mobility management NFs, such as AMFs and UPFs, may be included. Under the session management category, NF profile attributes of NFs that perform session management, such as SMFs, AMFs, PCFs, UPFs, and BSFs, may be included. Under the subscriber database category, attributes associated with subscriber database NFs, such as UDMs, UDRs, AUSFs, PCFs, NEFs, and UDSFs, may be included. Using the SUPI parameter as an example, if a consumer NF knows the SUPI of a subscriber but does not know in which PLMN the UDM serving the SUPI resides, the consumer NF may access the NF discovery data digest using the SUPI, obtain the PLMN ID that is mapped to the SUPI, and formulate an NF discovery request including the PLMN ID and the SUPI.

As illustrated in the example in Table 1, data is classified according to PLMN, locality, and network slice, to facilitate discovery of a producer NF that is co-located with or nearest to a consumer NF. Data classification is performed on the basis of NF data shared by network functions in NF profiles that are registered with the NRF. Classified data acts as input to the consumer NFs to use NF type specific attributes and attribute values to query and obtain the specific NF profile, which is for a producer NF in the same PLMN and network slice, providing a specific service, and belonging to specific locality. Subscriber and session management specific services can be accessed on a specific range of different attributes, such as SUPI, GPSI, DNN, and TAI supported by a specific NF instance. This can help the consumer NF to access the service in the most optimal way. The classification or mapping of data in the NF discovery data digest in Table 1 indicates to which PLMN, locality, and SNSSAI different data attributes, such as SUPI, GPSI, external group identity, DNN, belong. These mappings between:
  (SUPI, GPSI, external group identity, and DNN) and
    (PLMN, locality and SNSSAI)
allow a consumer NF to formulate an optimized NF discovery request, which can result in specific producer NF profiles being returned. Data classification can also be based on NF set ID and NF service set ID. Data can be classified based on load, capacity, and priority so that the NF does not get results with producer NFs that are more loaded or of lower priority than other available NFs.

A consumer NF or SCP may formulate an NF discovery request message using the NF discovery data digest by accessing the NF discovery data digest using a first NF profile attribute value, using one of the mappings to determine a second NF profile attribute value mapped to the first NF profile attribute value, and including the second NF profile attribute value in the NF discovery request. In one example, the first NF profile attribute value includes an attribute value associated with a subscriber (such as SUPI) and the second NF profile attribute value includes an attribute value associated with a producer NF (such as PLMN and/or locality).

Figure 3:
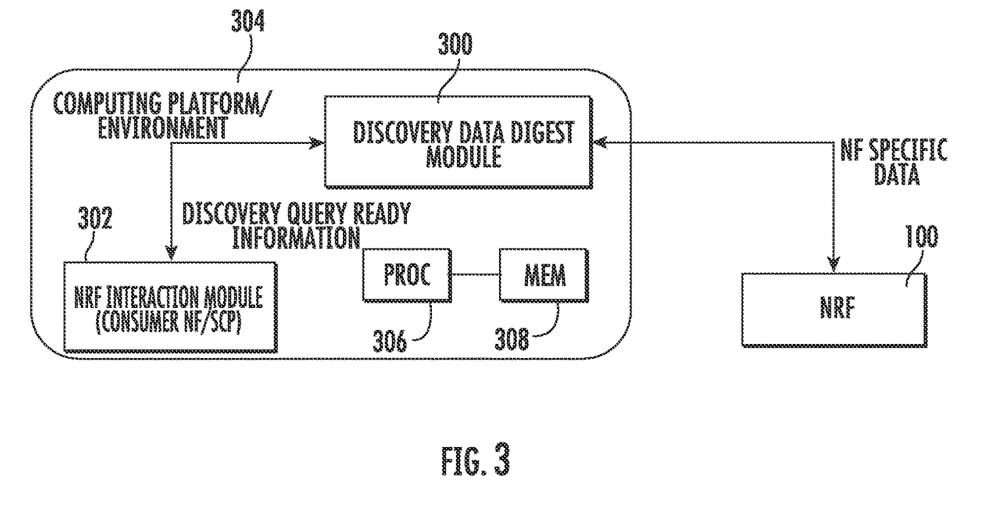
FIG. 3 is a block diagram illustrating an exemplary architecture for a consumer NF for implementing dynamic optimized NF discovery.

FIG. 3 is a network diagram illustrating an exemplary implementation of a discovery data digest module and an NRF interaction module that cooperate to perform dynamic optimized NF discovery. Referring to FIG. 3, discovery data digest module 300 and NRF interaction module 302 may be implemented on/in a computing platform or environment 304 that includes at least one processor 306 and memory 308. In one example, computing platform/environment 304 may be a cloud computing environment in which discovery data digest module 300 and NRF interaction module 302 are implemented using computer executable instructions stored in memory 308 and executed by processor 306. In a cloud-based environment, discovery data digest module 300 and NRF interaction module 302 may be implemented as microservices. In another example, computing platform/environment 304 may be an on premises computing platform located in an operator's network and discovery data digest module 300 and NRF interaction module 302 may be implemented using computer executable instructions stored in memory 308 and executed by processor 306 on the on-premises computing platform.

Discovery data digest module 300 is responsible for querying in NRF 100 periodically or a periodically for data based on operator input, obtaining the NF profile attribute values usable in NF discovery requests and classifying and storing the NF profile attribute values in the discovery data digest format described above with regard to Table 1. Discovery data digest module 300 may query NRF 100 for the NF data to be included in the NF discovery data digest independently from a need or query from NRF interaction module 302. NRF interaction module 302, which may reside on a consumer NF, an SCP, or another NRF separate from NRF 100 illustrated in FIG. 3, is responsible for creating optimized NF discovery request messages by obtaining query parameters to be included in the discovery request messages from NF profile attribute values stored the NF discovery data digest created by NF discovery data digest module 300.

Although in the example illustrated in FIG. 3, NRF interaction module 302 is shown as being implemented on a consumer NF or SCP, the subject matter described herein is not limited to such an implementation. In an alternate implementation, NRF interaction module 302 may be implemented on a computing platform separate from an NF or SCP, such as a standalone computing platform that receives messages from a consumer NF or SCP indicating the need for NF discovery and provides, in response to the messages, the query parameters from the NF discovery data digest to NRF interaction module 302 so that NRF interaction module 302 can formulate an optimized NF discovery request.

Discovery data digest module 300 can be implemented on the same computing platform or on a different computing platform from NRF interaction module 302. For example, if NRF interaction module 302 is implemented on a consumer NF or SCP, discovery data digest module 300 may be implemented on the consumer NF or SCP computing platform or on a computing platform separate from the consumer NF or SCP.

Figure 4:
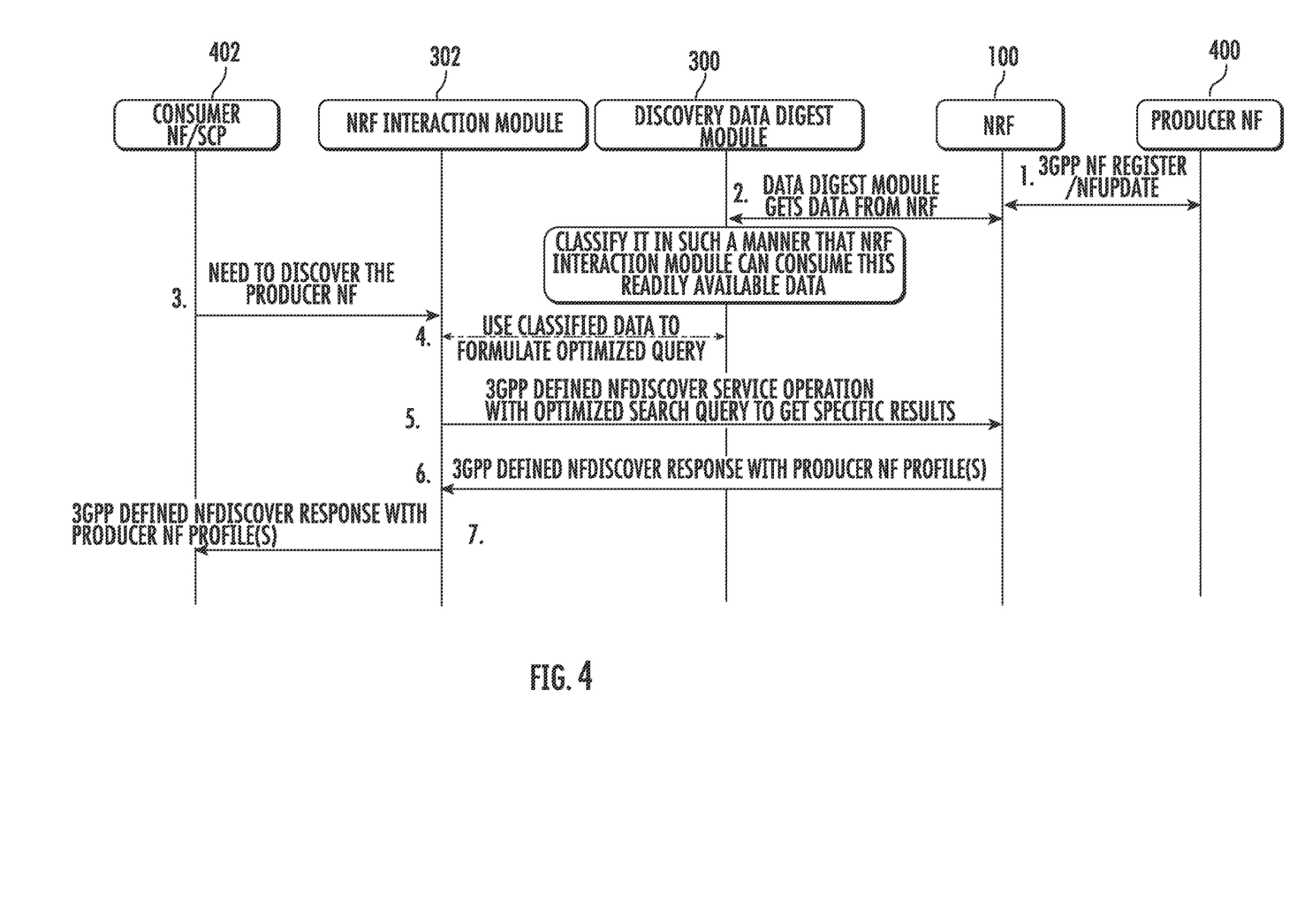
FIG. 4 is a message flow diagram illustrating exemplary messages exchanged in implementing dynamic optimized NF discovery.

FIG. 4 is a message flow diagram illustrating exemplary messages exchanged in implementing dynamic optimized NF discovery. Referring to FIG. 4, in line 1, a producer NF 400 registers or updates its NF profile with NRF 100. The registration or updating of the NF profile may be achieved using the NF register or NF update service operation as defined in 3GPP TS 29.510. NRF 100 stores or updates the NF profile of producer NF 400 in the NF profile database maintained by NRF 100.

In line 2, discovery data digest module 300 obtains NF profile data usable as query parameters in NF discovery requests from NRF 100. The obtaining of the NF profile data may be performed using the NF discovery service operation or using a proprietary API between discovery data digest module 300 and NRF 100 through which discovery data digest module 300 can obtain some or all of the NF profile information maintained by NRF 100 in its NF profiles database. It should be noted that the obtaining of the NF profile data by discovery data digest module 300 may be implemented or performed independently of a request or need from a consumer NF, SCP, or NRF interaction module 302. The obtaining or updating of the NF profile data by discovery data digest module 300 may be performed periodically or aperiodically to obtain/update NF profile data digests. Discovery data digest module 300 obtains the NF profile data and classifies the data to create the NF discovery data digest including attributes from the NF profile that are usable as query parameters in NF discovery request messages. Classifying the data also includes storing the data and maintaining mappings between the data, for example, between subscriber identifying parameters, such as the SUPI and network identifying parameters, such as the PLMN or NSSAI.

In line 3 of the message flow diagram, consumer NF/SCP 402 indicates to NRF interaction module 302 a need to discover a producer NF to provide a given service. If consumer NF/SCP 402 is implemented on the same computing platform as NRF interaction module 302, step 3 may be performed using internal messaging on the computing platform where the consumer NF or SCP module notifies the NRF interaction module of the service parameters associated with the needed service. If consumer NF/SCP 402 is implemented on a separate computing platform from NRF interaction module 302, step 3 may be implemented using the NF discovery service operation or a proprietary interface between consumer NF/SCP 402 and NRF interaction module 302.

In line 4 of the message flow diagram, NRF interaction module 302 uses the NF discovery data digest obtained and stored by discovery data digest module 300 to formulate an optimized NF discovery request message. For example, NRF interaction module 302 may query the NF discovery data digest using the service parameters received from consumer NF/SCP 402 and formulate an NF discovery request message that is optimized for the particular service type, location, load, etc. In line 5, NRF interaction module 302 transmits the NF discovery request with the discovery data digest module optimized query parameters to NRF 100. In line 6, NRF 100 sends an NF discovery response to NRF interaction module 302 with the producer NF profiles that were obtained using the optimized query parameters in line 7. NRF interaction module 302 provides the NF profiles obtained from NRF 100 to consumer NF/SCP 402. In the illustrated example, NRF interaction module 302 sends the NF profiles to consumer NF/SCP 402 in an NF discovery response message.

The following examples illustrate the NF discovery service operation with and without dynamic optimized NF discovery as described herein. In the first example, dynamic optimized NF discovery is not implemented for the case where an AMF needs to obtain NF profiles of UDMs serving a SUPI and belongs to the same or a nearest locality to the AMF. In such a case, the AMF may formulate an NF discovery request message of the following format:

/nnrf-disc/v1/nf-instances?requester-nf-type=AMF&target-nf-type=UDM&supi=imsi-7890123&preferred-locality=??

In the example, the locality attribute is listed as "??" because the AMF does not know the locality to include in the discovery request message after an initial discovery request fails to locate useful NF profiles. The AMF or other consumer NF may first query for the UDMs for a first preferred locality (most probably its own) for the required SUPI. In this example, it is assumed that the NRF returns an NF discovery response with no results or results which contain UDMs that are above acceptable load conditions. The consumer NF repeats the query for another locality (based on its configuration/implementation in a sequential manner). The consumer NF performs multiple round(s) of discovery queries until the consumer NF receives producer NF profiles that matches its requirements.

Issues with this approach include:
The consumer NF obtains NF profiles of producer NFs which are non-localized or not nearest to the consumer NF.
The search query may result in no producer NF profiles which can serve the required identifier (supi, service-names in the above example).
Receiving a no result set or a set of non-localized NF profiles increases business logic required to be implemented by the consumer NF to manipulate query parameters for successive retry attempts.
Requiring the consumer NF to implement multiple NF discovery queries to locate an NF profile that matches the need for a given service increases the latency in providing services and consumes resources in the 5G cover network.

In the following example, dynamic optimized NF discovery is implemented for the same case where the AMF wants to get profiles of UDMs serving s SUPI and belongs to a specific locality (i.e., the same locality as the AMF or a nearest locality to the AMF). In this example, the AMF or other consumer NF may first query the NF discovery data digest using the SUPI=imsi-7890123 based on its load as well as the nearest locality to the consumer NF to obtain query parameters usable to query the NRF. The consumer NF then formulates an NF discovery request using the attributes obtained from the NF discovery data digest as query parameters in the NF discovery request. An example of such an NF discovery request is as follows:

/nnrf-disc/v1/nf-instances?requester-nf-type=AMF&target-nf-type=UDM&supi=imsi-7890123&preferred-locality=locality-x In this example, the NF discovery request includes the nearest locality to the consumer NF of a UDM that can serve the identified SUPI. The nearest locality may be a locality other than the locality of the consumer NF, and the consumer NF would not have known about the nearest locality with UDMs that can serve the SUPI without the data obtained from the NF discovery data digest which mapped the locality, NF type, and SUPI attributes of the target UDMs to each other.

Benefits of this approach include:
an increased probability of getting NF profiles from the NRF that can be used by the consumer network function;
fewer queries to be made by the consumer NF to the NRF, hence reducing overall network traffic; and helping consumer NFs to process SBI service requests more quickly and hence reduces control plane latency.

Figure 5:
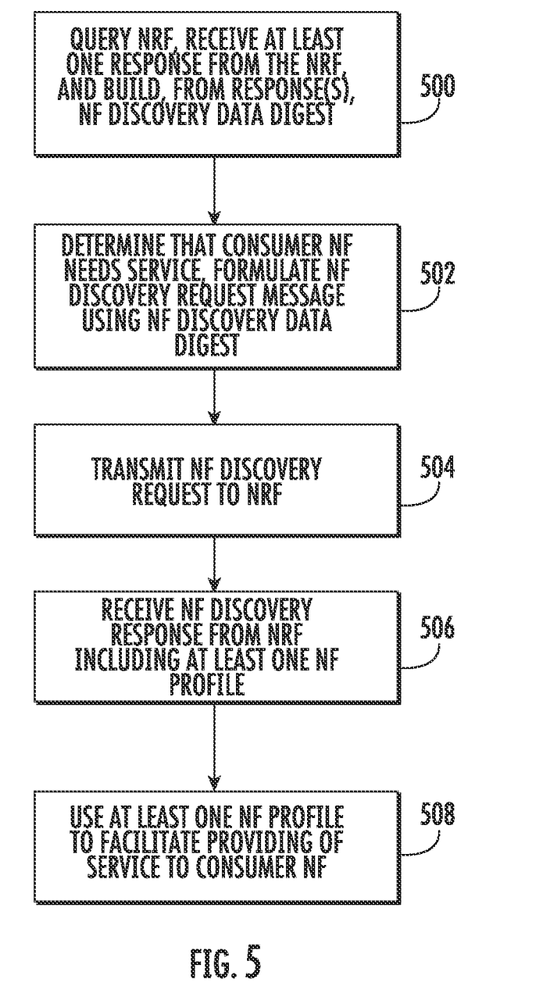
FIG. 5 is a flow chart illustrating exemplary steps of a process for dynamic optimized NF discovery.

FIG. 5 is a flow chart illustrating an exemplary process for dynamic optimized NF discovery. Referring to FIG. 5, in step 500, the process includes querying an NRF, receiving responses to the querying, and building, from the responses, an NF discovery data digest of NF profile attributes and corresponding attribute values usable as query parameters in NF discovery requests. For example, NF discovery data digest module 300 may periodically or aperiodically query NRF 100 to obtain a subset of NF profile parameters and mappings between the parameters that are usable by consumer NFs and SCPs to formulate targeted NF discovery request messages.

In step 502, the process includes determining that a consumer NF has a need for a service, and, in response, formulating, using the NF discovery data digest, an NF discovery request including at least one of the NF profile attribute values as a query parameter. For example, NRF interaction module 302, which may be co-located with or separate from a consumer NF or SCP, may determine that a user needs a service provided by one or more producer NFs based on receipt of a service based interface (SBI) request or NF discovery request from the consumer NF or SCP or based on receipt of internal consumer NF or SCP messaging indicating that a user needs a producer NF provided service. NRF interaction module 302 may utilize attributes associated with the consumer NF and requested service to query the NF discovery data digest, obtain NF profile attributes, and include the NF profile attributes as query parameters in an NF discovery request message.

In step 504, the process includes transmitting the NF discovery request message to the NRF. For example, NRF interaction module 302 may transmit the optimized NF discovery request message to NRF 100.

In step 506, the process includes receiving an NF discovery response from the NRF including at least one NF profile. For example, NRF interaction module 302 may receive an NF discovery response from NRF 100 that includes NF profiles that match one or more of the attributes in the optimized NF discovery request message.

In step 508, the process includes using the at least one NF profile to facilitate providing of the service to the consumer NF. For example, NRF interaction module 302 may forward the set of discovered NF profiles to the consumer NF or SCP. The consumer NF or SCP may select one of the NF profiles and transmit an SBI service request to the corresponding producer NF.

Overall benefits of dynamic optimized NF discovery include that it helps consumer NFs to more quickly discover co-located producer NFs and serving specific slices, which can serve the required use-case. Consumer NFs uses discovery query and the required data readily available, hence increases performance of consumer NFs. This may reduce hardware requirements. Control plane latency is reduced for use cases pertaining to attach procedures, packet data unit (PDU) connectivity and others. Dynamic optimized NF discovery is consistent with 5G technology latency requirements, especially for ultra low latency slices. Dynamic optimized NF discovery increases overall core-network performance with optimized data available. Dynamic optimized NF discovery facilitates network planning and bringing in new call flow changes for new use-cases. The recommended solution has no impact on existing 5GC call flows and is fully backward compatible with existing NF designs.

The disclosure of each of the following references is incorporated herein by reference in its entirety.

REFERENCES

1. $3^{rd}$ Generation Partnership Project; Technical Specification Group Core Network and Terminals; 5G System; Network Function Repository Services; Stage 3 (Release 17) 3GPP TS 29.510 V17.3.0 (2021-09)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for dynamic optimized network function (NF) discovery, the method comprising:
   querying an NF repository function (NRF), receiving at least one response to the querying, and building, from the at least one response, an NF discovery data digest of NF profile attributes and corresponding attribute values usable as query parameters in NF discovery requests;
   determining, that a consumer NF has a need for a service, and, in response to determining that the consumer NF has a need for a service;
   querying the NF discovery data digest to obtain optimized NF discovery request query parameters;
   formulating an NF discovery request message including the optimized NF discovery request query parameters; and
   transmitting the NF discovery request message to the NRF;
   receiving an NF discovery response from the NRF including at least one NF profile; and
   using the at least one NF profile to facilitate providing of the service to the consumer NF.

2. The method of claim 1 wherein querying the NRF includes periodically or aperiodically transmitting requests for NF discovery service operations to the NRF.

3. The method of claim 2 wherein periodically or aperiodically transmitting the requests for NF discovery service operations to the NRF includes transmitting the requests independently of a current need of the consumer NF for a service provided by producer NF instances.

4. The method of claim 1 wherein building the NF discovery data digest includes reading, from the at least one response, a subset of NF profile attributes and attribute values usable as query parameters in the NF discovery request message.

5. The method of claim 1 wherein building the NF discovery data digest includes creating, in the NF discovery data digest, mappings between the NF profile attributes read from the at least one response.

6. The method of claim 5 wherein creating the mappings between the NF profile attributes includes classifying the attributes into sets of NF profile attributes that are mapped to one or more common attributes, wherein the common attributes include at least one of: public land mobile network (PLMN), network slice instance (nsi)-list, service name, single network slice selection assistance information (S-NSSAI), and locality.

7. The method of claim 6 wherein the attributes that are mapped to the one or more common attributes include attributes associated with individual NF types.

8. The method of claim 5 wherein querying the NF discovery data digest to obtain optimized NF discovery request query parameters includes accessing the NF discovery data digest using a first NF profile attribute value and using one of the mappings to determine a second NF profile attribute value mapped to the first NF profile attribute value and formulating the NF discovery request message comprises including the second NF profile attribute value in the NF discovery request message.

9. The method of claim 8 wherein the first NF profile attribute value includes an attribute value associated with a subscriber and the second NF profile attribute value includes an attribute value associated with a producer NF.

10. The method of claim 1 wherein using the at least one NF profile to facilitate providing of the service to the consumer NF includes forwarding the at least one NF profile to the consumer NF or a service communication proxy (SCP) that performs delegated discovery on behalf of the consumer NF.

11. A system for dynamic optimized network function (NF) discovery, the system comprising:
a computing platform or environment including at least one processor;
an NF discovery data digest module implemented using the at least one processor for querying an NF repository function (NRF), receiving at least one response to the querying, and building, from the at least one response, an NF discovery data digest of NF profile attributes and corresponding attribute values usable as query parameters in NF discovery requests; and
an NRF interaction module for determining that a consumer NF has a need for a service, and, in response to determining that the consumer NF has a need for a service, querying the NF discovery data digest to obtain optimized NF discovery request query parameters, formulating an NF discovery request message including the optimized NF discovery request query parameters, transmitting the NF discovery request message to the NRF, receiving an NF discovery response from the NRF including at least one NF profile, and using the at least one NF profile to further providing of the service to the consumer NF.

12. The system of claim 11 wherein the NF discovery data digest module is configured to query the NRF by periodically or aperiodically transmitting requests for NF discovery service operations to the NRF.

13. The system of claim 12 wherein the NF discovery data digest module is configured to periodically or aperiodically transmit the requests for NF discovery service operations to the NRF independently of a current need of the consumer NF for a service provided by producer NF instances.

14. The system of claim 11 wherein the NF discovery data digest module is configured to build the NF discovery data digest by reading, from the at least one response, a subset of NF profile attributes and attribute values usable as query parameters in the NF discovery request message and store the subset of NF profile attributes and attribute values in the NF discovery data digest.

15. The system of claim 11 wherein the NF discovery data digest module is configured to build the NF discovery data digest by creating mappings between the NF profile attributes read from the at least one response.

16. The system of claim 15 wherein the NF discovery data digest module is configured to create the mappings between the NF profile attributes by classifying the NF profile attributes into sets that share one or more common NF profile attributes, wherein the one or more common NF profile attributes include at least one of: public land mobile network (PLMN), network slice instance (nsi)-list, service name, single network slice selection assistance information (S-NSSAI), and locality.

17. The system of claim 16 wherein the attributes that are mapped to the one or more common attributes include attributes associated with individual NF types.

18. The system of claim 15 wherein the NRF interaction module is configured to query the NF discovery data digest to obtain optimized NF discovery request query parameters by accessing the NF discovery data digest using a first NF profile attribute value and using one of the mappings to determine a second NF profile attribute value mapped to the first NF profile attribute value and to formulate the NF discovery request message by including the second NF profile attribute value in the NF discovery request message.

19. The system of claim 11 wherein the NRF interaction module is configured to facilitate the providing of the service to the consumer NF by forwarding the at least one NF profile to the consumer NF or a service communication proxy (SCP) that performs delegated discovery on behalf of the consumer NF.

20. One or more non-transitory computer readable media having stored thereon executable instructions that when executed by one or more processors of one or more computers control the one or more computers to perform steps comprising:
querying a network function (NF) repository function (NRF), receiving at least one response to the querying, and building, from the at least one response, an NF discovery data digest of NF profile attributes and corresponding attribute values usable as query parameters in NF discovery requests;
determining that a consumer NF has a need for a service, and, in response to determining that the consumer NF has a need for a service:
querying the NF discovery data digest to obtain optimized NF discovery request query parameters;
formulating an NF discovery request message including the optimized NF discovery request query parameters; and
transmitting the NF discovery request message to the NRF;
receiving an NF discovery response from the NRF including at least one NF profile; and
using the at least one NF profile to facilitate providing of the service to the consumer NF.

\* \* \* \* \*

UNITED STATES PATENT AND TRADEMARK OFFICE
CERTIFICATE OF CORRECTION

PATENT NO. : 11,652,895 B1
APPLICATION NO. : 17/672639
DATED : May 16, 2023
INVENTOR(S) : Sapra et al.

It is certified that error appears in the above-identified patent and that said Letters Patent is hereby corrected as shown below:

On the Title Page

On page 4, Column 1, under Other Publications, Line 6, delete "IEFT" and insert -- IETF --, therefor.

In the Specification

In Column 2, Line 21, delete "(SUR)." and insert -- (SUPI). --, therefor.

In Column 11, Line 27, delete "SUPI" and insert -- SUPI, --, therefor.

In Column 14, Line 6, delete "09)" and insert -- 09). --, therefor.

In the Claims

In Column 14, Line 25, in Claim 1, delete "service;" and insert -- service: --, therefor.

Signed and Sealed this
Sixth Day of August, 2024

Katherine Kelly Vidal
*Director of the United States Patent and Trademark Office*